United States Patent [19]
Graham et al.

[11] Patent Number: 5,821,915
[45] Date of Patent: Oct. 13, 1998

[54] METHOD AND APPARATUS FOR REMOVING ARTIFACTS FROM SCANNED HALFTONE IMAGES

[75] Inventors: James J. Graham; Judson Veazey, both of Fort Collins; Michael J. Yancey, Eaton, all of Colo.

[73] Assignee: Hewlett-Packard Company, Palo Alto, Calif.

[21] Appl. No.: 540,633

[22] Filed: Oct. 11, 1995

[51] Int. Cl.$^6$ ..................................................... G09G 5/36
[52] U.S. Cl. ........................ 345/138; 345/136; 358/454; 358/456
[58] Field of Search ..................................... 345/138, 149, 345/148, 136; 382/274, 275; 358/454, 456, 459

[56] References Cited

U.S. PATENT DOCUMENTS

| | | | |
|---|---|---|---|
| 4,833,723 | 5/1989 | Loveridge et al. | 382/53 |
| 5,504,504 | 4/1996 | Markandey et al. | 345/138 |
| 5,533,149 | 7/1996 | Kaplan et al. | 382/275 |

*Primary Examiner*—Richard A. Hjerpe
*Assistant Examiner*—Kent Chang

[57] ABSTRACT

A method for removing artifacts from a bitmap of image data produced by scanning a halftone image may comprise the steps of: (a) calculating a weighted average intensity value for a target pixel based on a weight factor for the target pixel and on weight factors for neighboring pixels in the bitmap of image data; (b) repeating step (a) for each pixel in the bitmap of image data; and (c) replacing the intensity value of each pixel in the bitmap of image data with the weighted average intensity value for each such pixel.

9 Claims, 7 Drawing Sheets

FIG.6

|   |   |   |   |   |   |   |   |   |   |   |   |
|---|---|---|---|---|---|---|---|---|---|---|---|
| 5 | 3 | 2 | 4 | 2 | 3 | 5 | 3 | 3 | 5 | 3 | 2 | 4 |
| 3 | 5 | 4 | 2 | 4 | 1 | 3 | 5 | 3 | 2 | 4 | 1 | 2 |
| 2 | 3 | 4 | 2 | 1 | 4 | 2 | 3 | 4 | 1 | 1 | 4 | 3 |
| 5 | 1 | 2 | 4 | 2 | 2 | 5 | 3 | 2 | 4 | 2 | 3 | 5 |
| 3 | 4 | 1 | 1 | 5 | 3 | 3 | 4 | 2 | 3 | 5 | 3 | 3 |
| 3 | 2 | 4 | 3 | 3 | 5 | 2 | 1 | 4 | 3 | 3 | 5 | 1 |
| 1 | 3 | 2 | 4 | 3 | 3 | 5 | 2 | 1 | 4 | 3 | 3 | 5 |
| 4 | 4 | 2 | 3 | 5 | 4 | 2 | 4 | 1 | 3 | 5 | 2 | 1 |

FIG.7

| 1 | 7 | 5 | 2 | 0 | 2 | 2 | 5 | 5 | 1 | 3 | 1 | 34 | TOTAL CHANGE |
| 26 | 25 | 18 | 23 | 25 | 25 | 27 | 25 | 20 | 25 | 26 | 23 | 24 | SUM PROFILES |
| (5) | 3 | 2 | 4 | 2 | 3 | 5 | 3 | 3 | 5 | 3 | 2 | 4 |
| (3) | 5 | 4 | 2 | 4 | 1 | 3 | 5 | 3 | 2 | 4 | 1 | 2 |
| (2) | 3 | 4 | 2 | 1 | 4 | 2 | 3 | 4 | 1 | 1 | 4 | 3 |
| (5) | 1 | 2 | 4 | 2 | 2 | 5 | 3 | 2 | 4 | 2 | 3 | 5 |
| (3) | 4 | 1 | 1 | 5 | 3 | 3 | 4 | 2 | 3 | 5 | 3 | 3 |
| (3) | 2 | 4 | 3 | 3 | 5 | 2 | 1 | 4 | 3 | 3 | 5 | 1 |
| (1) | 3 | 2 | 4 | 3 | 3 | 5 | 2 | 1 | 4 | 3 | 3 | 5 |
| (4) | 4 | 2 | 3 | 5 | 4 | 2 | 4 | 1 | 3 | 5 | 2 | 1 |

FIG.8

| 2 | 2 | 0 | 1 | 5 | 9 | 1 | 4 | 0 | 1 | 1 | 27 | TOTAL CHANGE |
|---|---|---|---|---|---|---|---|---|---|---|---|---|
| 24 | 26 | 24 | 24 | 23 | 18 | 27 | 28 | 24 | 24 | 23 | 24 | 23 | SUM PROFILES |
| ⑤ | 3 | 2 | 4 | 2 | 3 | 5 | 3 | 3 | 5 | 3 | 2 | 4 | 70 |
| ③ | 5 | 1 | 2 | 4 | 1 | 3 | 5 | 3 | 2 | 4 | 1 | 2 | |
| 2 | ③ | 4 | 2 | 1 | 4 | 2 | 3 | 4 | 1 | 1 | 4 | 3 | 37 |
| 5 | ① | 2 | 4 | 2 | 2 | 5 | 3 | 2 | 4 | 2 | 3 | 5 | 44 |
| 3 | 4 | ① | 1 | 5 | 3 | 3 | 4 | 2 | 3 | 5 | 3 | 3 | |
| 3 | 2 | ④ | 3 | 3 | 5 | 2 | 1 | 4 | 3 | 3 | 5 | 1 | 40 |
| 1 | 3 | 2 | ④ | 3 | 3 | 5 | 2 | 1 | 4 | 3 | 3 | 5 | |
| 4 | 4 | 2 | ③ | 5 | 4 | 2 | 4 | 1 | 3 | 5 | 2 | 1 | 42 |

FIG.9

| 19 | 1 | 19 | 16 | 3 | 16 | 19 | 2 | 8 | 1 | 11 | 3 | 118 | TOTAL CHANGE |
|---|---|---|---|---|---|---|---|---|---|---|---|---|---|
| 37 | 16 | 15 | 34 | 18 | 21 | 37 | 18 | 20 | 28 | 29 | 18 | 21 | SUM PROFILES |
| ⑤ | 3 | 2 | 4 | 2 | 3 | 5 | 3 | 3 | 5 | 3 | 2 | 4 | 70 |
| 3 | ⑤ | 1 | 2 | 4 | 1 | 3 | 5 | 3 | 2 | 4 | 1 | 2 | |
| 2 | 3 | ④ | 2 | 1 | 4 | 2 | 3 | 4 | 1 | 1 | 4 | 3 | 37 |
| 5 | 1 | 2 | ④ | 2 | 2 | 5 | 3 | 2 | 4 | 2 | 3 | 5 | 44 |
| 3 | 4 | 1 | 1 | ⑤ | 3 | 3 | 4 | 2 | 3 | 5 | 3 | 3 | |
| 3 | 2 | 4 | 3 | 3 | ⑤ | 2 | 1 | 4 | 3 | 3 | 5 | 1 | 40 |
| 1 | 3 | 2 | 4 | 3 | 3 | ⑤ | 2 | 1 | 4 | 3 | 3 | 5 | |
| 4 | 4 | 2 | 3 | 5 | 4 | 2 | ④ | 1 | 3 | 5 | 2 | 1 | 42 |

METHOD AND APPARATUS FOR REMOVING ARTIFACTS FROM SCANNED HALFTONE IMAGES

FIELD OF INVENTION

This invention relates to optical scanners in general and more specifically to a method and apparatus for improving the image quality of scanned halftone images.

BACKGROUND

Most photographic images that are reproduced on paper are reproduced using a halftone printing process. For example, a black and white image is reproduced by the halftone printing process by photographing the image through a fine screen or grid. The purpose of the screen is to divide the continuous photographic image into a plurality of tiny dots, the darkness and density of which effectively reproduce the various shades of gray contained in the original photograph. The screen is generally selected so that the image dots are so small that they cannot be resolved by the eye when the halftone image is viewed at a normal distance. Consequently, the halftone image appears to be continuous, rather than a large number of individual dots.

The screen that is used to create the tiny halftone image dots is generally rectilinear so that the resulting image dots occur at regular intervals and are arranged along rows that are evenly spaced from one another. The screen is also usually placed over the original photograph at an angle to reduce the chances of creating interference patterns, such as moiré patterns, with features in the image. The spacing between the rows of dots is referred to herein as the "halftone period," and the angle at which the rows of dots are inclined with respect to the "vertical" side of the image is referred to as the "halftone angle."

Halftone images are commonly used and may appear in a wide variety of printed media, such as newspapers, magazines, books, and comic books, just to name a few. For example, a black and white halftone image appearing in a newspaper may have about fifty (50) rows of dots per inch a halftone period of $\frac{1}{50}$), inclined at an angle of about 45° (the halftone angle) with respect to the "vertical" side of the image. Of course, higher quality black and white images, such as those found in books, are possible by decreasing the halftone period and dot size.

High quality halftone images may have up to 200 rows of dots per inch (i.e., a halftone period of $\frac{1}{200}$).

Color images may also be reproduced with the halftone process, with common examples being color comics appearing in the Sunday papers and, of course, the higher quality color images typically found in books. In the color halftone process, the color image comprises three sets of dots of different colors, typically the subtractive primary pigments of yellow, cyan, and magenta. Black may also be added to the image to secure more perfectly black features. As is the case for black and white halftone images, the dots of each respective color in a color halftone image are arranged in rows of dots. However, the rows of dots for each respective color are typically inclined at different angles with respect to the vertical. For example, the yellow dots may be inclined at an angle of 22.5°, the cyan dots at 45°, and the magenta dots at 67.5°. The black dots may be inclined at an angle of about 45° or about −22.5°.

Optical scanners are devices that produce machine (e.g., computer) readable data which are representative of a scanned object, such as a page of printed text or a halftone image. Briefly, a typical optical scanner uses a line-focus system to focus light reflected by the image onto the surface of a detector, such as a linear photosensor array that comprises a plurality of tiny light sensitive elements arranged along a line. Each element in the array corresponds to a small area location on the image that is commonly referred to as a "picture element" or "pixel," and produces a data signal that is representative of the intensity of light from the pixel. Since the detector typically comprises a one dimensional array of photoelements arranged along a line, the electronic signals produced by the elements in the array together correspond to a small slice or line on the image that is commonly referred to as a "scan line." Accordingly, the entire image may be scanned by moving the optical system with respect to the image so that the elements of the detector are successively exposed to adjacent scan lines on the image. As the image is scanned, then, data signals from the photoelements of the detector are received and processed by an appropriate data processing system which may subsequently store the data on a suitable medium or generate a display signal therefrom, allowing the image of the object to be reproduced on a display device such as a CRT or a printer.

While it is possible to scan a halftone image with an optical scanner of the type described above, the halftone image dots may create a number of image "artifacts" that detract significantly from the appearance and usability of the scanned image. For example, at certain scanning resolutions, the image pixels and halftone dots may interfere, creating moiré patterns which, if severe, may make the scanned image unusable. If the scanning resolution is adjusted to eliminate such moiré patterns, the halftone image dots themselves may appear in the scanned image, again reducing the quality of the image.

While several methods have been developed in attempts to remove such image artifacts, they have tended to be somewhat less than totally effective, or have required computationally intensive algorithms. For example, methods have been developed that utilize two-dimensional frequency analysis methods, such as fast Fourier transforms (FFT), to determine the halftone period and angle, and then use simple averaging algorithms to "filter" the image data.

Unfortunately, however, such FFT methods are computationally intensive and tend to be relatively slow or require powerful computers. Also, the simple averaging algorithms that are used to "filter" the image data tend to be inaccurate, which may create other kinds of image distortions.

Consequently, a need exists for a method and apparatus for removing artifacts from a scanned halftone image that does not rely on computationally-intensive algorithms, such as fast Fourier transforms, which can require significant processing time, thus slow down the artifact removal process. Such an improved system would desirably also achieve increased image reproduction accuracy, but without compromising the ability to remove substantially all of the artifacts from the halftone image.

SUMMARY OF THE INVENTION

The invention may comprise a method for removing artifacts from a bitmap of image data produced by scanning a halftone image. The halftone image has a plurality of image dots arranged along a plurality of halftone lines.

The halftone lines are oriented at a halftone angle and spaced at a halftone period. The bitmap of image data includes a plurality of pixels, each pixel having an intensity value. The method of removing artifacts may comprise the steps of: (a) calculating a weighted average intensity value for a target pixel based on a weight factor for the target pixel and onweight factors for neighboring pixels in the bitmap of image data; (b) repeating step (a) for each pixel in the bitmap of image data; and (c) replacing the intensity value of each pixel in the bitmap of image data with the weighted average intensity value for each such pixel.

The invention may also comprise a method of determining the halftone angle and the halftone period of the halftone image. This method may comprise the steps of: selecting a plurality of pixels from the bitmap of image data corresponding to m rows of n columns of pixels; adding together the intensity values of the m pixels in each of the n columns of pixels to create a SumProfile for each of the n columns of pixels and for each of a predetermined number of ColumnOffset values; adding together the SumProfiles for each of the ones of the ColumnOffset values to create a TotalChange corresponding to each of the predetermined number of ColumnOffset values; finding the ColumnOffset value that corresponds to a greatest TotalChange, wherein the ColumnOffset value for the greatest TotalChange corresponds to the halftone angle; for the ColumnOffset value corresponding to the greatest TotalChange, finding a plurality of maxima SumProfiles and a plurality of minima SumProfiles, the maxima and minima SumProfiles corresponding to various ones of the n columns of pixels; and calculating an average number of columns of pixels separating adjacent maxima SumProfiles and minima SumProfiles, the average number of columns of pixels being substantially equal to one-half of the halftone period.

BRIEF DESCRIPTION OF THE DRAWING

Illustrative and presently preferred embodiments of the invention are shown in the accompanying drawing in which:

FIG. 6 is a schematic representation of an mxn array of image data;

FIG. 7 is a schematic representation of the mxn array of image data shown in FIG. 6 showing how the SumProfile values are computed for a ColumnOffset corresponding to a scan angle of 0°;

FIG. 8 is a schematic representation of the mxn array of image data shown in FIG. 6 showing how the SumProfile values are computed for a ColumnOffset corresponding to a scan angle of 22.5°;

FIG. 9 is a schematic representation of the mxn array of image data shown in FIG. 6 showing how the SumProfile values are computed for a ColumnOffset corresponding to a scan angle of 45°;

DETAILED DESCRIPTION OF THE INVENTION

A method and apparatus 10 for removing artifacts from scanned halftone images is best seen in FIGS. 1–4 as it could be implemented by a general purpose programmable computer, such as a personal computer 12, connected to an optical scanner 14. The personal computer 12 may also be connected to a suitable display device, such as a CRT 16, that may be used to display the substantially artifact-free image (not shown). Alternatively, the substantially artifact-free image may be reproduced by a printer (not shown) connected to the computer 12. Since the method and apparatus 10 for removing artifacts from scanned halftone images may be performed by a general purpose programmable computer, such as personal computer 12, program code for performing some of the steps of the processes described herein appears in Appendices I and II, which are specifically incorporated herein and form a part of this disclosure.

Figure 1:
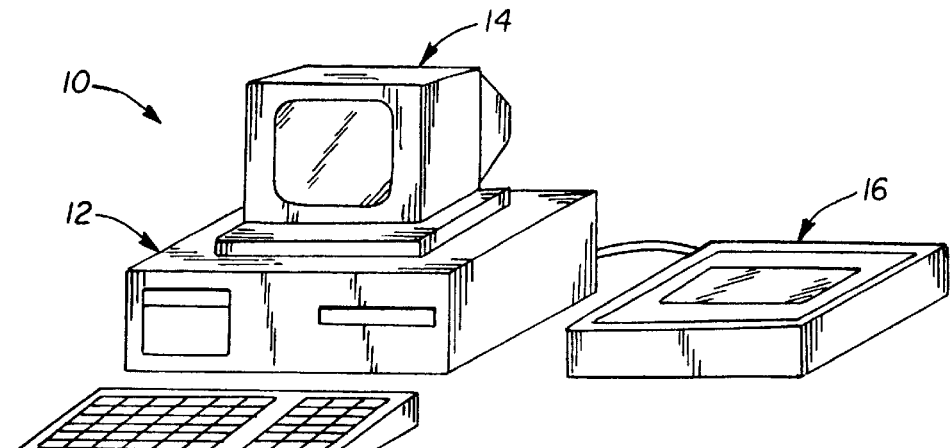
FIG. 1 is a perspective view of a computer and optical scanner for executing a computer program for removing artifacts from scanned halftone images.
Figure 2:
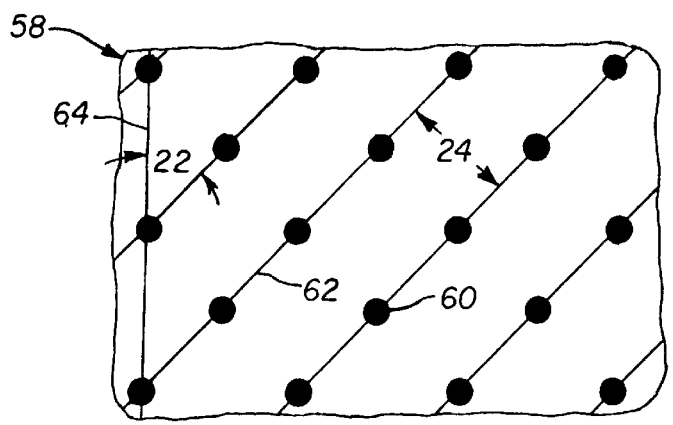
FIG. 2 is a greatly enlarged view of a halftone image showing the arrangement of the halftone image dots along periodic rows and the inclination of the rows with respect to the "vertical" side of the image.

Referring now to FIG. 2, the halftone image 58 scanned by the scanner 14 may comprise a plurality of halftone image dots 60 arranged along a plurality of rows 62 that are inclined from the "vertical side" 64 of the image 58 by a halftone angle 22. As was briefly described above, the rows 62 of image dots 60 are inclined at the halftone angle 22 to reduce the chances of creating interference patterns with features in the image. The rows 62 of halftone dots 60 are also separated by a halftone period 24.

Figure 3:
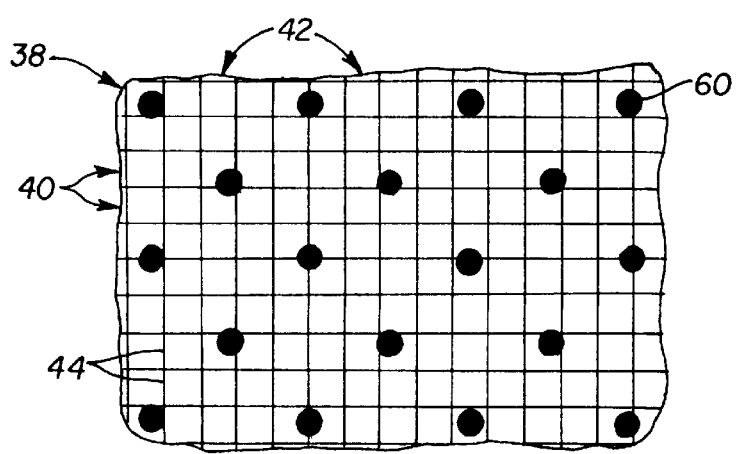
FIG. 3 is a schematic view, shown greatly enlarged, of a two-dimensional bitmap array of pixels superimposed over the halftone image shown in FIG. 2.

The optical scanner 14 used to scan the halftone image 58 produces a stream of image data corresponding to the intensity of the pixels comprising the original image. While the stream of image data may be handled by the optical scanner 14 and computer 12 in any of a wide variety of manners depending on the particular electronic configuration of the scanner 14 and computer 12, it is convenient to think of the stream of image data as a two-dimensional array or bitmap 38 in which the image data are arranged into a plurality of rows 40 and columns 42, as best seen in FIG. 3. The number of rows 40 and columns 42 contained within bitmap 38 are such that each row 40 corresponds to a single scan line (not shown) and the number of columns 42 corresponds to the total number of individual scan lines required to form the entire image. Thus, each datum 44 in the bitmap 38 is equivalent to a pixel on the original halftone image 58. Therefore, the two dimensional array of image data shown in FIG. 3 is referred to herein as a bitmap 38 and the individual data as pixels 44. In the bitmap 38, then, each pixel 44 has associated with it an intensity value 70 (not shown in FIG. 3, but shown in FIG. 6) that corresponds to the actual intensity of the pixel on the original halftone image 58.

Figure 4:
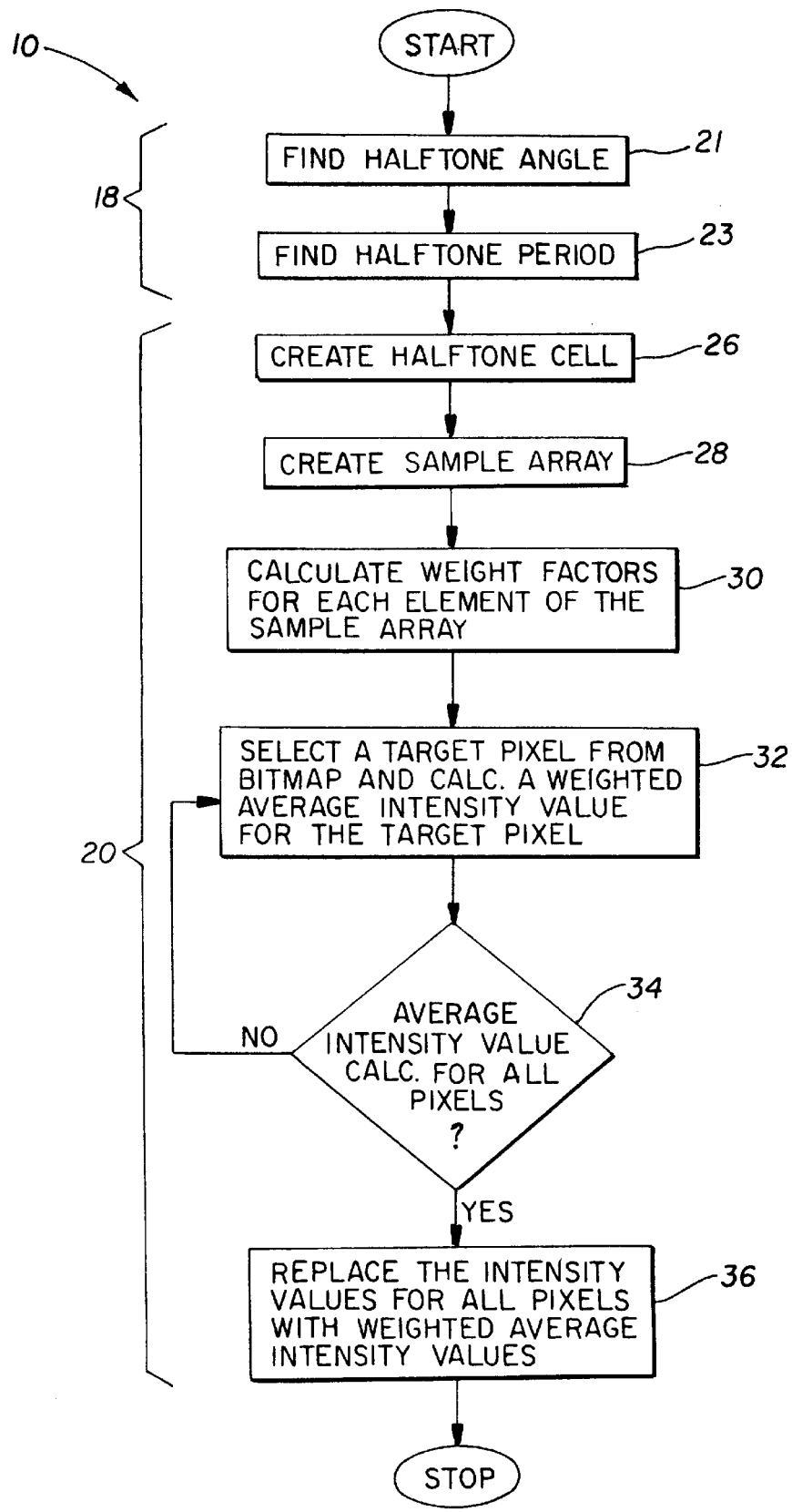
FIG. 4 is a flow diagram of the process steps comprising the method for removing artifacts from scanned halftone images.
Figure 5:
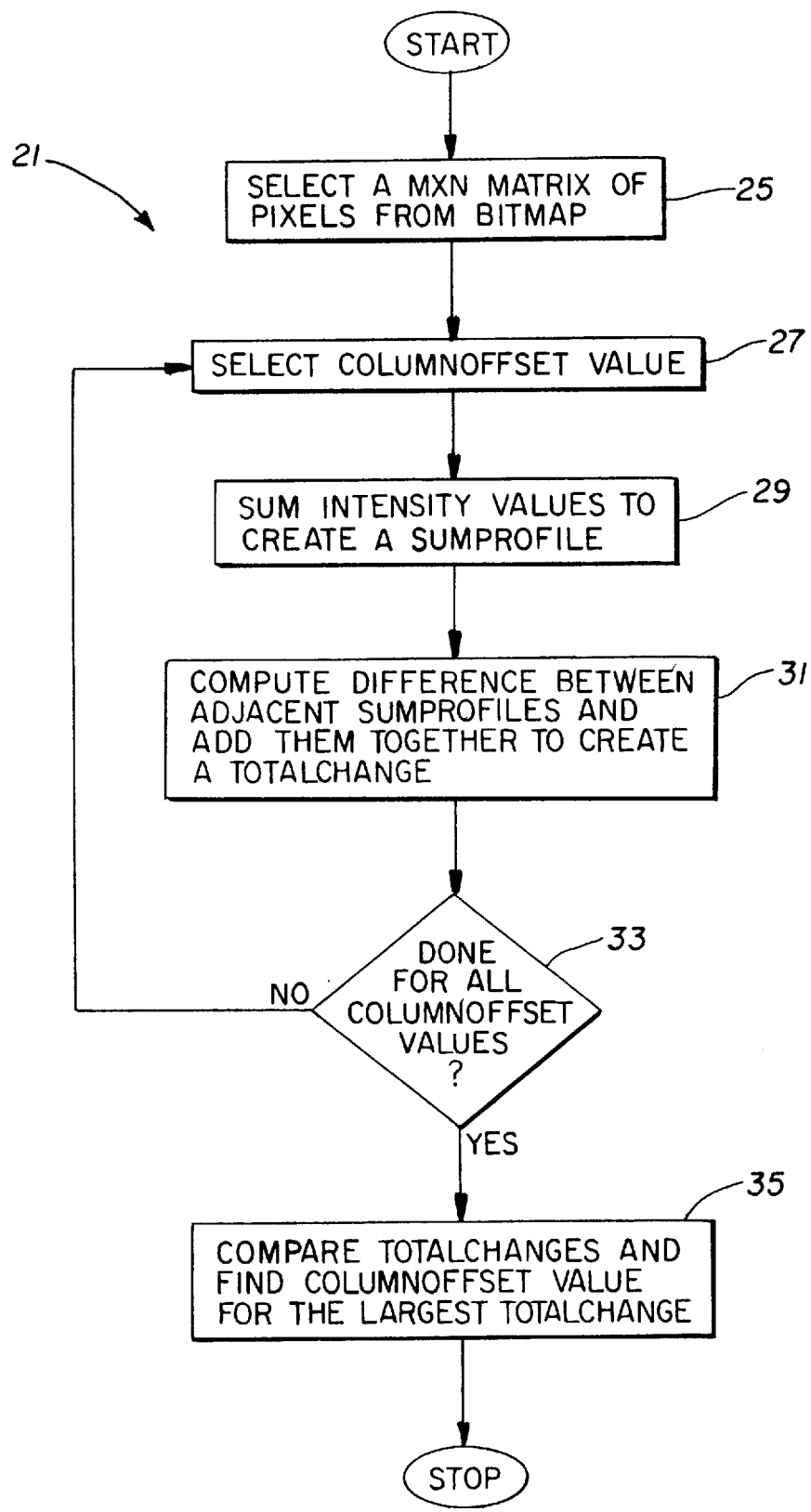
FIG. 5 is a flow diagram of the Find Halftone Angle step shown in FIG. 4.

Referring now to FIG. 4, the method 10 for removing artifacts from scanned halftone images may comprise two main subroutines: a Halftone Find subroutine 18 and a Halftone Removal subroutine 20. The Halftone Find subroutine 18 determines the halftone angle 22 and the halftone period 24 (FIG. 2). As will be explained in greater detail below, the Halftone Find subroutine 18 adds together columns 42 of intensity values 70 (FIG. 6) of the pixels 44 at various preselected offset angles. The offset angle that produces the maximum differences between the various sums of intensity values corresponds to the halftone angle 22 (FIG. 2). The halftone period 24 is then determined by calculating the average number of pixels 44 separating the various maxima and minima of the sum of intensity values.

Figure 11:
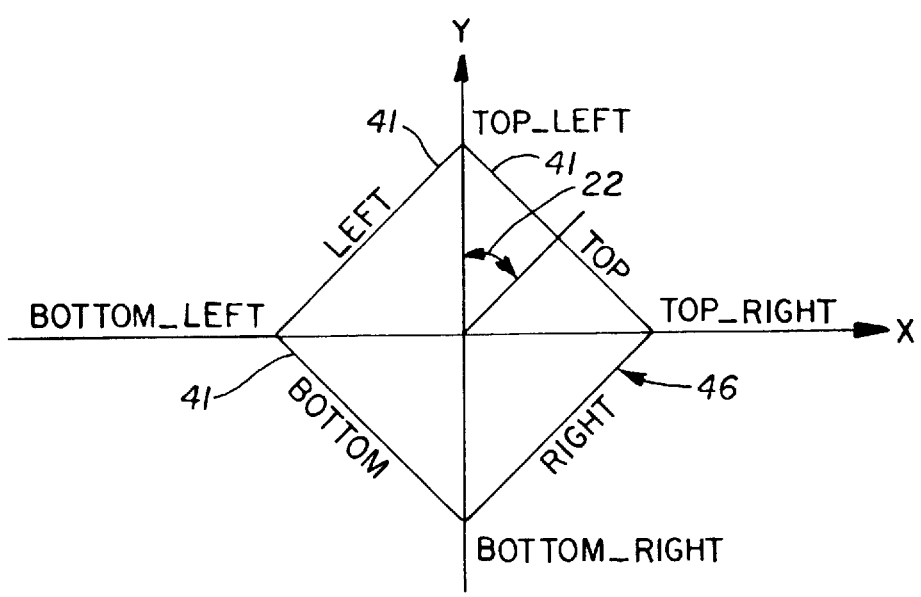
FIG. 11 is a schematic diagram of a halftone cell oriented at the halftone angle with respect to the Y or "vertical" axis and showing the nomenclature used to identify the various sides and corners of the halftone cell.

The halftone removal subroutine 20 is more complex and essentially creates a spatial filter from which are derived weighted intensity values that are used to replace the original intensity values 70 (FIG. 6) of the pixels of the bitmap 38 (FIG. 3). More specifically, the halftone removal subroutine 20 uses the halftone angle 22 and halftone period 24 to define a halftone cell 46, as best seen in FIG. 11. A sample array 48 is then created around the halftone cell 46 so that the sample array 48 contains within its borders the entire halftone cell 46 when the halftone cell 46 is positioned at the halftone angle 22. See FIG. 12. The sample array 48 is also defined so that, in addition to being sufficiently large to encompass the halftone cell 46, it is also comprises an integer multiple of elements 50. The size of each element 50 is equal to the size of each pixel 44 so that there is a one-to-one correspondence the elements 50 contained within the sample array 48 and the pixels 44 contained within the bitmap 38.

Having created the sample array 48, the halftone removal subroutine 20 next calculates a weight factor having a value between 0 and 1 for each element 50 in the sample array 48. Each weight factor corresponds to the geometric overlap between the halftone cell 46 and each element 50. That is, if the element 50 is completely overlapped by the halftone cell 46, then the weight factor for that element is set equal to 1. Similarly, if only half of the element 50 is overlapped by the halftone cell 46, then the weight factor for that element is set equal to 0.5.

After a weight factor has been determined for each element 50 in the sample array 48, the halftone removal subroutine 20 then selects a target pixel 74 from the bitmap 38 of pixels 44 and "constructs" the sample array 48 over the target pixel 74 so that the center 54 of the array 48 is coincident with the upper left hand corner of the target pixel 74. See FIG. 13. The sample array 48 thus defines a neighborhood of pixels 56 that corresponds to the elements 50 of the sample array 48. The halftone removal subroutine 20 then calculates a weighted average intensity value for the target pixel 74. This is accomplished by first multiplying the intensity value 70 (FIG. 6) of each pixel 44 in the neighborhood of pixels 56 by the weight factor for the corresponding element 50 in the sample array 48. The product is referred to herein as a weighted pixel value. The weighted pixel values for each pixel 44 in the neighborhood of pixels 56 are then added together and the sum divided by the size, in pixels, of the halftone cell 46. The resulting quotient is the weighted average intensity value for the target pixel 74. The sample array 48 therefore acts as a spatial filter and the weighted average intensity value calculated for the target pixel 74 represents a weighted average of the intensity values of the surrounding pixels 44 contained within the neighborhood 56.

The foregoing process is repeated until a weighted average intensity value has been calculated for each pixel 44 in the bitmap 38. Process step 36 is then executed which replaces the original intensity values 70 of the pixels 44 in the bitmap 38 with the corresponding weighted average intensity values (not shown) just calculated. The resulting bitmap may then be processed as a bitmap of conventional image data to produce a substantially artifact-free image of the original halftone image.

A significant advantage of the method and apparatus 10 for removing artifacts from scanned halftone images is that it does not rely on computationally-intensive algorithms, such as fast Fourier transforms (FFTs), to determine the halftone period and halftone angle. Consequently, the Halftone Find subroutine 18 can quickly and efficiently determine the halftone angle 22 and halftone period 24. Another advantage of the present invention is that the spatial filtering accomplished by the Halftone Removal subroutine 20 provides for much more accurate filtering of the image data than is achievable with many of the simple averaging algorithms that have been used in the past.

Having briefly summarized the method 10 for removing artifacts from scanned halftone images, as well as some of its more significant features and advantages, the method 10 will now be described in detail. Referring back now to FIGS. 1 and 2, a general purpose programmable computer, such as personal computer 12, may be programmed to perform the steps comprising the method 10 for removing artifacts from a halftone image 58 (FIG. 2) scanned by the optical scanner 14. In one preferred embodiment, the program containing the instructions for performing the method 10 may be loaded into the computer 12 by way of any convenient medium well-known in the art, such as a magnetic or optical disk (not shown). Alternatively, the computer 12 may be programmed by any other of a wide variety of methods and/or devices well known in the art for programming general purpose computers to perform specific functions. In still another embodiment, the method 10 may be performed by a device (not shown) specifically designed (e.g., "hard wired") to carry out the steps of the method 10.

A halftone image 58 of the type that may be scanned by the optical scanner 14 is shown greatly enlarged in FIG. 2. As was described above, halftone image 58 comprises a plurality of halftone image dots 60 positioned along a plurality of rows 62 that are arranged in generally parallel, spaced-apart relation. The spacing 24 between the rows 62 is referred to herein as the "halftone period" and has the dimensions of pixels. The rows 62 of dots 60 are inclined from the vertical line 64 by a halftone angle 22.

Referring now to FIG. 3, the optical scanner 14 produces a digitized data stream that may be arranged as a bitmap 38 of image data, with each datum or pixel 44 having associated with it an intensity value 70 (FIG. 6) that is related to the intensity of the corresponding pixel on the original image. As was described above, the bitmap 38 of image data may be conveniently represented as a two dimensional array of pixels 44 arranged into a plurality of rows 40 and columns 42. Each row 40 corresponds to a single scan line (not shown) and the number of columns 42 corresponds to the number of individual scan lines required to form the entire image. Therefore, each pixel 44 in the bitmap 38 has associated with it an intensity value 70 (FIG. 6) that is related to the actual intensity of the pixel on the image being scanned.

The method 10 for removing artifacts from scanned halftone images is best seen in FIG. 4 and comprises a Halftone Find subroutine 18 and a Halftone Removal subroutine 20. The Halftone Find subroutine 18 is used to determine the halftone angle 22 and the halftone period 24 and comprises two main process steps: A Find Halftone Angle process 21 and a Find Halftone Period process 22.

The Find Halftone Angle process 21 is best understood by referring to FIGS. 5–9 simultaneously. The first step 25 in the Find Halftone Angle process 21 is to select an mxn matrix of pixels 37 from the bitmap 38, as shown in FIG. 6.

By way of example, the mxn matrix 37 shown in FIG. 6 comprises 8 rows 40 and 13 columns 42 of pixels 44, with each pixel 44 having an intensity value 70 between 1 and 5. Before proceeding with this description, however, it should be noted that the size of the matrix 37 shown in FIG. 6 and the intensity values 70 shown therein were selected for the purposes of conveniently describing the present invention and do not necessarily represent the actual size of the matrix 37 or the associated intensity values that would exist in an actual implementation of the method and apparatus 10 according to the present invention. For example, in one preferred embodiment, the matrix 37 may comprise a two dimensional array having 1,500 rows 40 and 1,200 columns 42 and with intensity values ranging from 0 to 255 for an 8-bit grayscale image data representation. Once the matrix of pixels 37 has been selected by step 25, the Find Halftone Angle process 21 (FIG. 5) proceeds to step 27 and selects a predetermined ColumnOffset value.

Briefly, the ColumnOffset value allows the Find Halftone Angle process 21 to simulate re-scanning of the halftone image 58 at various scan angles by simply manipulating the intensity values 70 contained within the matrix 37. The reason for simulating re-scanning of the halftone image at various different scan angles is that a repeating pattern or "beat" may be detected in the intensity values 70 contained within bitmap 38 if the halftone image is scanned at an angle that is substantially equal to the halftone angle 22 (FIG. 2). That is, since the rows 62 of dots 60 in the original halftone image 58 are inclined at the halftone angle 22, a scan of the halftone image 58 at substantially that same angle produces a repeating pattern or beat in the intensity of the pixels of the halftone image. Thus, the Find Halftone Angle process 21 determines the halftone angle 22 by simulating the re-scan of the image at various scan angles until the repeating pattern or beat is detected.

Referring now to FIGS. 7–9, several different ColumnOffset values may be selected to offset the columns 42 of intensity values 70 to simulate re-scanning of the halftone image 58 at various scan angles. The ColumnOffset angle that produces the largest changes between the various maxima and minima of the sum of intensity values (the SumProfile) for the various columns 42 corresponds to the halftone angle 22 (FIG. 2) of the original halftone image. For example, for the matrix of pixels 37 shown in FIGS. 7–9, the ColumnOffset is initially set to zero (0) and an OffsetIncrement, which is equal to the sine of the desired scan angle, is added to the ColumnOffset after summing the intensity values 70 for each row 40. Thus, a ColumnOffset value of 0 corresponds to a scan angle of 0°. Likewise, a ColumnOffset value of 0.5 corresponds to a scan angle 22 of 22.5°, and a ColumnOffset value of 1 corresponds to a scan angle of 45°. Program step 27 is used to increment the ColumnOffset through the various values that correspond to different scan angles.

Proceeding now to step 29 and FIG. 7, a SumProfile is computed for each ColumnOffset value set by step 27. Essentially, SumProfile is the sum of the pixel intensity values 70 located in the particular columns 42 determined by the ColumnOffset value. For example, the ColumnOffset value for FIG. 7 is 0 (corresponding to a scan angle of 0°), which means that the columns 42 of pixel intensity values are not offset at all. Consequently, the SumProfile value for each column 42 is the arithmetic sum of the intensity values 70 for the pixels 44 in each column. Accordingly, the SumProfile value for the leftmost column 42 in FIG. 7 is the sum of the encircled intensity values 70 in the left-most column, i.e., 26. The SumProfile value for the next column to the right is 25, and so on. Once all of the SumProfile values for a selected ColumnOffset are computed, step 31 computes the difference between adjacent SumProfile values and adds them together to create a TotalChange. The TotalChange for the ColumnOffset of 0 shown in FIG. 7 is equal to 1+7+5+2+0+2+2+5+5+1+3+1 or 34. Proceeding now via step 33 to the next ColumnOffset value of 0.5 (corresponding to a halftone angle 22 of 22.5°), steps 29 and 31 are repeated. However, since the ColumnOffset value is now 0.5, the columns 42 with each new pair of rows 40 are shifted one column to the right. See FIG. 8. Consequently, the SumProfile value for the left most column 42 in FIG. 8 is equal to the sum of the encircled intensity values 70, that is, 5+3+3+3+1+1+4+4+3 for a total of 24. The SumProfile values are similarly computed for the remaining columns 42, keeping in mind that the columns 42 are shifted one column to the right for each new pair of rows 40. When the right most column 42 is reached, the intensity values 70 in that same row 40, but starting in the left most column are used. That is, the shifted intensity values 70 "roll back" to the left most column 42. The differences between the adjacent SumProfile values are also shown in FIG. 8, and yield a TotalChange that is equal to 2+2+0+1+5+9+1+4+0+1+1+1 or 27. The same process steps 29 and 31 are now repeated for a ColumnOffset value of 1 (corresponding to a scan angle 22 of 45°) shown in FIG. 9, keeping in mind that the columns 42 are shifted one column to the right for each row 40. Thus, the SumProfile value for the left-most column 42 in FIG. 9 is equal to the sum of the encircled intensity values 70, i.e., 5+5+4+4+5+5+5+4 for a total of 37. Again, the SumProfile values for the remaining columns 42 are similarly computed, keeping in mind that the columns 42 are shifted one column to the right for each new row 40. The differences between the adjacent SumProfile values are also shown in FIG. 9 and, when added together, yield a TotalChange that is equal to 19+1+19+16+3+16+19+2+8+1+11+3 for a total of 118.

Step 35 (FIG. 5) of Find Halftone Angle process 21 compares the TotalChange value calculated in step 31 for each ColumnOffset value and finds the largest TotalChange. In this case, the largest TotalChange was 118, which corresponds to a ColumnOffset of 1. Since a ColumnOffset of 1 corresponds to a scan angle of 45°, the halftone angle 22 for the example shown in FIG. 6 and described above is equal to 45°(i.e., the repeating pattern or "beat" occurs when the scan angle is substantially equal to the halftone angle 22.

Figure 10:
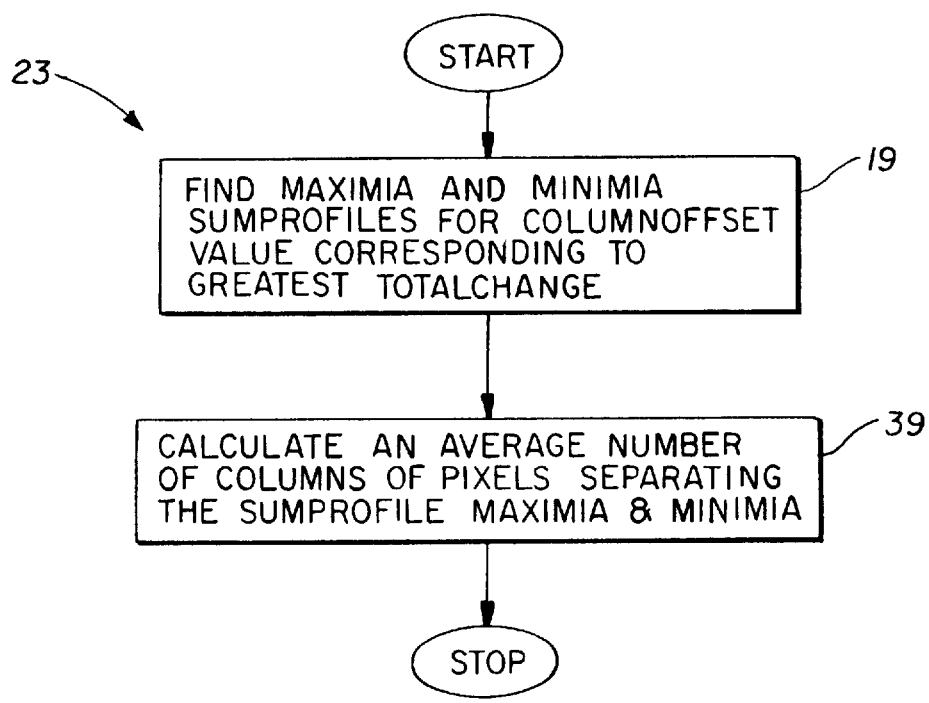
FIG. 10 is a flow diagram of the Find Halftone Period step shown in FIG. 4.

Referring back now to FIG. 4, the Find Halftone Period process 23 is next executed, as best seen in FIG. 10. The Find Halftone Period 23 first executes step 19 which finds the maxima and minima SumProfiles for the ColumnOffset value corresponding to the halftone angle 22 (i.e., FIG. 9 in this example). After the maxima and minima SumProfiles are found, process step 39 is executed to calculate an average number of columns 42, i.e., pixels 44, separating the maxima and minima. For the example shown in FIG. 9, the maxima SumProfiles from left to right are 37, 34, 37, and 29. The minima SumProfiles from left to right are 15, 18, 18, and 18. The average number of columns 42, i.e., pixels 44, between the maxima and minima SumProfiles is calculated by summing the number of columns 42 from a maximum to an adjacent minimum and from a minimum to an adjacent maximum. The sum is then divided by the total number of transitions from maximum to minimum and minimum to maximum. Thus, for the example shown in FIG. 9, the number of columns 42 between the maxima and the adjacent minima are (from left to right): 2 (between SumProfile maximum 37 and SumProfile minimum 15); 1 (between SumProfile maximum 34 and SumProfile minimum 18); 1 (between SumProfile maximum 37 and SumProfile minimum 18); and 1 (between SumProfile maximum 29 and SumProfile minimum 18). The number of columns between the minima and the adjacent maxima are (from left to right): 1 (between SumProfile minimum 15 and SumProfile maximum 34); 2 (between SumProfile minimum 18 and SumProfile maximum 37); and 3 (between SumProfile minimum 18 and SumProfile maximum 29). The average number of columns 42 between the maxima and minima is thus equal to 2+1+1+1+1+2+3 divided by the total number of transitions (7), or 1.57. The halftone period 24 is twice the average number of columns, thus the halftone period 24 is approximately equal to 3 columns or pixels 44.

Having computed the halftone angle 22 and the halftone period 24 (FIG. 2), the Halftone Removal subroutine 20 (FIG. 4) is next executed to remove the artifacts from the halftone image data. However, before proceeding with a detailed description of the Halftone Removal subroutine 20, recall that the subroutine 20 essentially creates a spatial filter from which are derived weighted intensity values that are used to replace the original intensity values 70 (FIG. 6) of the pixels 44 of the bitmap 38 (FIG. 3). Referring now to FIGS. 4 and 11, the halftone removal subroutine 20 (FIG. 4) executes step 26 which creates a halftone cell 46 (FIG. 11). Essentially, the halftone cell 46 comprises a rectangle with sides 41 having lengths (in units of pixels) equal to the halftone period 24 (FIG. 2), which was just calculated and is also in units of pixels. The halftone cell 46 is inclined with respect to the Y-axis (i.e., vertical axis) at the halftone angle 22. Thus, for the case where the halftone period 24 is equal to three (3) pixels and the halftone angle 22 is 45°, process 26 creates a halftone cell 46 having an orientation with respect to the X-Y axes substantially as shown in FIG. 11, with the sides and corners of the halftone cell 46 being referred to as "Top," "Right," "Bottom," etc., as indicated in FIG. 11.

The next step in the process 26 (FIG. 4) is to calculate the equations of the lines that define the sides 41 of cell 46 as well as the locations of the corners "Top_Left," "Top_Right," "Bottom_Right," and "Bottom_Left." While the equations of the lines and the X-Y coordinates of the corners may be determined by any of a wide variety of well-known algorithms, the line equations and corner coordinates of the halftone cell 46 may be determined according to the process steps listed in Appendix I. The Halftone Removal process 20 (FIG. 4) then proceeds to step 28 to create a sample array.

Figure 12:
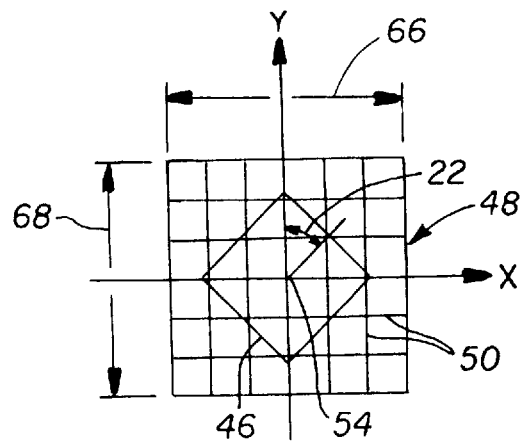
FIG. 12 is a schematic diagram of a sample array created to encompass the halftone cell shown in FIG. 11.

Referring now to FIG. 12, a sample array 48 of elements 50 is created that has a width 66 and a height 68 sufficient to encompass the halftone cell 46 when the cell 46 is positioned at the halftone angle 22. The elements 50 of the sample array 48 have dimensions identical to those of the pixels 44 (FIG. 3). Therefore, each element 50 may be considered equivalent to a pixel 44. The width 66 and height 68 of the sample array 48 are also such that the sample array 48 includes an integer number of whole elements 50 (e.g., thirty-six (36) in FIG. 12). Using the notation referred to above and in Appendix I for the halftone cell 46, the width 66 and height 68 of the sample array 48 are calculated according to the following algorithm:

if (Top_Right.X > (-Top_Left.X)) then
    Width = 2*Top_Right.X
else
    Width = 2*Top_Left.X Similarly:

if (Top_Left.Y > -Top_Right.Y) then
    Height = 2*Top_Left.Y
else
    Height = 2*Top_Right.Y The width 66 and height 68 are in units of pixels. Thus, for the case shown in FIGS. 11 and 12, where the halftone cell 46 is three (3) pixels square and tilted at 45°, process 26 described above will create a sample array 48 having a width of 6 elements 50 and a height of 6 elements 50.

Once the sample array 48 has been created, step 30 (FIG. 4) calculates the weight factor (not shown) to be assigned to each element 50 in the sample array 48. The weight factor for each element 50 is a real number between 0 and 1 and is linearly proportional to the geometric overlap of the halftone cell 46 on the element 50. That is, if the element 50 is not covered or overlapped at all by the halftone cell 46, then the weight factor for that element 50 is set to 0; if the element 50 is only half covered by the halftone cell 46, then the weight factor for the element 50 is set to 0.5. Similarly, if the element 50 is completely covered by the halftone cell 46, then the weight factor for the element is set to 1. While a number of different processes may be resorted to for determining the geometric overlap of the halftone cell 46 on the various elements 50 comprising the sample array 48, thus determine the weight factors, one embodiment of the invention determines the weight factors as follows.

The first step in determining the weight factors is to determine or classify the overlap of the halftone cell 46 with the various elements 50 of the sample array 48. Once the nature of the overlap is classified, the weight factors are then calculated for the elements 50 of the sample array 48. The number of calculations required can be significantly reduced by utilizing the symmetry of the sample array 48 about the X-Y axes. For example, in one preferred embodiment, the weight factors are calculated only for those elements 50 contained within the upper right-hand quadrant (as defined by the X-Y axes) of the sample array 48. The weight factors for the remaining elements can then be determined by "mirroring" about the X and Y axes the weight factors calculated for the elements 50 in the upper right-hand quadrant, as would be obvious to persons having ordinary skill in the art. The steps used by process 30 are set forth in Appendix II.

After the weight factors have been determined for each element 50 in the sample array 48, the process proceeds to step 32 (FIG. 4), which selects a target pixel 74 from the bitmap 38 and calculates a weighted average intensity value for the target pixel 74 (FIG. 13) Step 32 is repeated by way of step 34 until a weighted average intensity value has been calculated for each pixel 44 in the bitmap 38.

Figure 13:
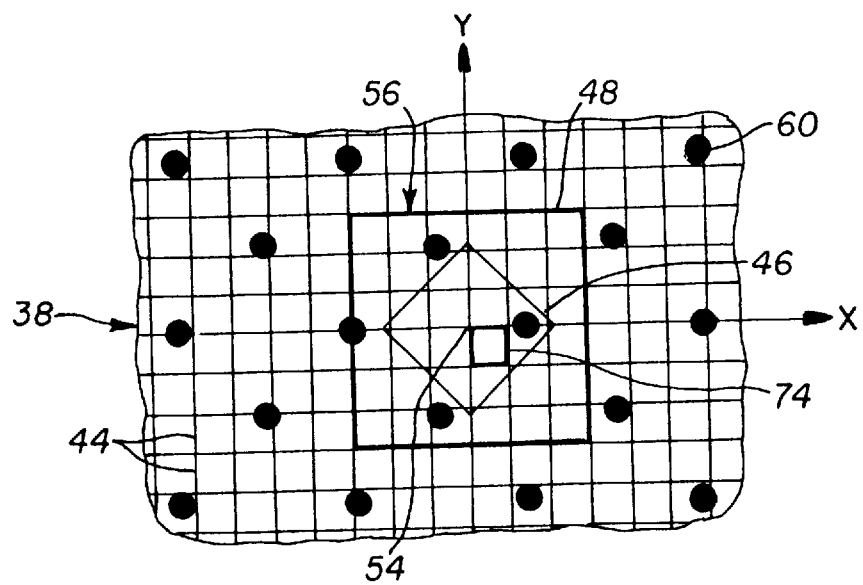
FIG. 13 is a schematic representation showing the sample array and halftone cell positioned over a target pixel in the two-dimensional bitmap array shown in FIG. 3.

The details of step 32 are best understood by referring to FIGS. 4 and 13. Essentially, step 32 begins by selecting a target pixel 74 from the bitmap 38. The target pixel 74 is that pixel for which a weighted average intensity value is to be calculated. The weighted average intensity value is calculated by "superimposing" the sample array 48 over the target pixel 74 so that the origin 54 of the X-Y axis is coincident with the upper left-hand corner of the target pixel 74. The sample array 48 thus defines a neighborhood of pixels 56 that corresponds to the size of the sample array 48. That is, each pixel 44 in the neighborhood of pixels 56 corresponds to an element 50 in the sample array 48. Having so correlated the target pixel 74 and the pixels 44 contained within the neighborhood of pixels 56 with the elements 50 in the sample array 48, the intensity value 70 (FIG. 6) for the target pixel 74 and for each of the pixels 44 in the neighborhood 56 is multiplied by the weight factor of the corresponding element 50 to create a plurality of weighted pixel values. Stated another way, each weighted pixel value is the product of the intensity value 70 for a pixel 44 and the weight factor for the corresponding element 50. The weighted pixel values for the target pixel 74 and the pixels 44 in the neighborhood 56 are then added together to create a sum of weighted pixel values. The sum of weighted pixel values is then divided by the area, in pixels, of the halftone cell 46 to create a weighted average intensity value for the target pixel 74. Expressed mathematically:

$$IV_{avg} = \frac{\Sigma(IV_{pixel} * WF_{pixel})}{N} \quad (1)$$

where:

$IV_{avg}$=Weighted average intensity value for the target pixel 76;

$IV_{pixel}$=Intensity value 70 for each pixel 44;

$WF_{pixel}$=Weight factor for each element 50 corresponding to a pixel 44; and

N=Area, in pixels, of the halftone cell 46.

Process steps 32 and 34 (FIG. 4) are repeated until a weighted average intensity value has been calculated for each pixel 44 in the bitmap 38. Step 36 is then executed which replaces the intensity values 70 for each of the pixels 44 in the bitmap 38 with the corresponding weighted average intensity values. The bitmap 38 of image data may then be used or processed as desired as if it were a conventional bitmap of image data.

It is contemplated that the inventive concepts herein described may be variously otherwise embodied and it is intended that the appended claims be construed to include alternative embodiments of the invention except insofar as limited by the prior art.

APPENDIX I

The following code is used to determine the coordinates of the corners and the equations of the lines that define the halftone cell 46 with respect to the X–Y axes. The positions of the corners are notated by the ".X" and ".Y" extensions, and the parameters for the line equations are noted with the ".M" and ".B" extensions to conform the variables with the standard slope-intercept form for a line equation in an X–Y coordinate system, i.e., y=mx+b. The halftone angle 22 is denoted as "Angle" and the halftone period 24 is denoted as "Period":

```
Top.M = -Tan(Angle);
Top.B = (Period/2) (Cos(Angle)+Tan(Angle)*Sin(Angle));
Bottom.M = -Tan(Angle);
Bottom.B = (Period/2) (Cos(Angle)-Tan(Angle)*Sin(Angle));
Left.M = Tan(90-Angle);
Left.B = (Period/2) (Sin(Angle)+Tan(90-Angle)*Cos(Angle));
Right.M = Tan(90-Angle);
Right.B = -(Period/2) (Sin(Angle)-Tan(90-Angle)*Cos(Angle));
Top_Left.X = (Period/2) (Sin(Angle)-Cos(Angle));
Top_Left.Y = (Period/2) (Cos(Angle)+Sin(Angle));
Top_Right.X = (Period/2) (Cos(Angle)+Sin(Angle));
Top_Right.Y = (Period/2) (Cos(Angle)-Sin(Angle));
Bottom_Left.X = -Top_Right.X;
Bottom_Left.Y = -Top_Right.Y;
Bottom_Right.X = -Top_Left.X;
Bottom_Right.Y = -Top_Left.Y;
```

APPENDIX II

The following code is used to calculate the weight factors for each of the elements 50 in the upper righthand quadrant of the sample array 48. In addition to the parameters used for the code in Appendix I, the code contained within this Appendix II also uses the following parameters:

| | |
|---|---|
| Factor: | is the weight factor for each element 50; |
| TopSide: | refers to the top side of the halftone cell 46; |
| RightSide: | refers to the right side of the halftone cell 46; |
| LeftSide: | refers to the left side of the halftone cell 46; |
| Element_X: | X coordinate of the element 50 for which the Factor is being determined; |
| Element_Y: | Y coordinate of the element 50 for which the Factor is being determined; |
| Intersection_X | X coordinate of the intersection of two sides of the halftone cell 46; |
| Intersection_Y | Y coordinate of the intersection of two sides of the halftone cell 46; |

The following parameters are relative to the bottom left corner of the element 50 for which the Factor is being determined:

| | |
|---|---|
| TopIntercept: | X coordinate of a side of the halftone cell 46 intersecting the top of the element 50; |
| BottomIntercept: | X coordinate of a side of the halftone cell 46 intersecting the bottom of the element 50; |
| LeftIntercept: | Y coordinate of a side of the halftone cell 46 intersecting the left side of the element 50; and |
| RightIntercept: | Y coordinate of a side of the halftone cell 46 intersecting the right side of the element 50. |

When more than one side of the halftone cell 46 intersects an element 50, the Intercept and Side parameters are combined to refer to the intercept of a side of the halftone cell 46 with a particular side of the element 50 (e.g., TopSide_LeftIntercept refers to the Y position of the location where the TopSide of the halftone cell 46 intercepts the left side of the element 50 for which the Factor is being determined.

```
1.  Elements in a Quadrant with No Corners:
Factor = OneLineWithNegativeSlope(TopSide)
2.  Elements in a Quadrant with an Upper Right Corner:

if (TopSide_BottomIntercept<0)
    Factor = 0
else if (RightSide_TopIntercept<0)
    Factor = 0
else if (TopSide_TopIntercept>1)
    if (RightSide_BottomIntercept>1)
        Factor = 1
    else
        Factor = OneLinePositiveSlope(RightSide)
else
    if (RightSide_BottomIntercept>1)
        Factor = OneLineNegativeSlope(TopSide)
    else
        if (Element_Y<Intersection_X)
            Factor=OneLinePositiveSlope(RightSide)
        else if (Element_Y>Intersection_X)
            Factor=OneLineNegativeSlope(TopSide)
        else
            Factor=TwoLinesWithUpperRightCorner( )
3.  Elements in a Quadrant with an Upper Left Corner:

if (TopSide_BottomIntercept>=1)
    Factor = 0
else if (RightSide_BottomIntercept<=0)
    Factor = 0
else if (TopSide_TopIntercept<0)
    if (RightSide_TopIntercept>1)
        Factor = 1
    else
        Factor = OneLineNegativeSlope(RightSide)
else
```

```
        if (RightSide_TopIntercept>1)
            Factor = 1-OneLinePositiveSlope(TopSide)
        else
            if (Element_X<Intersection_Y)
                Factor=1-OneLinePositiveSlope(TopSide)
            else if (Element_X>Intersection_Y)
                Factor=OneLineNegativeSlope(RightSide)
            else
                Factor=TwoLinesWithUpperLeftCorner( )
  4. Elements in a Quadrant with Two Corners:

if (TopSide_BottomIntercept<=0)
    Factor = 0
else if (LeftSide_BottomIntercept>=1)
    Factor = 0
else if (RightSide_TopIntercept<=0)
    Factor = 0
else if (LeftSide_TopIntercept<0)
    if (TopSide_TopIntercept>1)
        if (RightSide_BottomIntercept>1)
            Factor = 1
        else
            Factor=OneLinePositiveSlope(RightSide)
    else
        if (RightSide_BottomIntercept>1)
            Factor = OneLineNegativeSlope(TopSide)
        else
            if (Element_Y<Intersection_X2)
Factor=OneLinePositiveSlope(RightSide)
                else if (Element_Y>Intersection_X2)
Factor=OneLineNegativeSlope(RightSide)
                else
                    Factor=TwoLinesWithUpperRightCorner( )
    else
        if (TopSide_TopIntercept>1)
            if (RightSide_BottomIntercept>1)
                Factor=1-OneLinePositiveSlope(LeftSide)
            else
                Error Condition
        else
            if (RightSide_BottomIntercept>1)
                if (Element_X<Intersection_Y1)
                    Factor=1-OneLinePositiveSlope(LeftSide)
                else if (Element_X>Intersection_Y1)
                    Factor=OneLineNegativeSlope(TopSide)
                else
                    Factor=TwoLinesWithUpperLeftCorner( )
            else
                Error Condition
```

I. The Routines referenced the above code are as follows:
A. OneLineWithPositiveSlope:

```
if (BottomIntercept>1)
    Factor=1
else if (TopIntercept<0)
    Factor=0
else if (TopIntercept<1)
    if (BottomIntercept<0)
        Factor=OneCorner(TopIntercept, LeftIntercept)
    else
        Factor=OneSlice(BottomIntercept, TopIntercept)
else
    if (BottomIntercept>1)
        Factor=1-OneCorner(1-BottomIntercept, 1-
        TopIntercept)
    else
        Factor=OneSlice(-RightIntercept,
        -LeftIntercept)
```

B. OneLineWithNegativeSlope:

```
if (TopIntercept>1)
    Factor=1
```

```
else if (BottomIntercept<0)
    Factor=0
else if (TopIntercept>0)
    if (BottomIntercept>=1)
        Factor=1-OneCorner(1-TopIntercept, 1-
        Right Intercept)
    else
        Factor=OneSlice(TopIntercept, BottomIntercept)
else
    if (BottomIntercept<=1)
        Factor=OneCorner(BottomIntercept,
        LeftIntercept)
    else
        Factor=OneSlice(RightIntercept, LeftIntercept)
```

C. TwoLinesWithUpperLeftCorner:
    This routine is identical to the following routine "TwoLinesWithUpperRightCorner" if the corners and sides of the halftone cell 46 are mirrored about a 45° line through the origin of the X–Y axis. Consequently, the factors for the elements 50 may be computed by simply calling the routine "TwoLinesWithUpperRightCorner."
D. TwoLinesWithUpperRightCorner:

```
if (TopSide=TopRightCorner)
    if (RightSide=BottomRightCorner)
        Factor=TwoCornersWithoutIntersection(RightSide_Right-
        Intercept, 1-RightSide_BottomIntercept, 1-TopSide_Right
        Intercept, 1-TopSide_TopIntercept)
    else if (RightSide=LeftRightSlice)
        Factor=OneCornerOneSliceWithoutIntersection(1-
        TopSide_RightIntercept, TopSide_TopIntercept,
        RightSide_LeftIntercept, RightSide_RightIntercept)
    else
        Error Condition
else if (TopSide=LeftRightSlice)
    if (RightSide=BottomRightCorner)
        Factor=OneCornerOneSliceWithoutIntersection
        (RightSide_RightIntercept, 1-RightSide_BottomIntercept,
        1-TopSide_LeftIntercept, 1-TopSide_RightIntercept)
    else
        Error Condition
if (TopSide=BottomLeftCorner)
    if(RightSide=TopBottomSlice)
        Factor=OneCornerOneSliceThatIntersect(TopLeft_LeftIntercept,
        TopSide_BottomIntercept, RightSide_BottomIntercept,
        RightSide_TopIntercept, BOTTOM_LEFT)
    else if (RightSide=LeftRightSlice)
        Factor=OneCornerOneSliceThatIntersect(TopSide_BottomInter-
        cept, TopLeft_LeftIntercept, RightSide_LeftIntercept,
        RightSide_RightIntercept, LEFT)
    else if (RightSide=TopLeftCorner)
        Factor=TwoCornersThatIntersect(1-RightSide_LeftIntercept,
        RightSide_TopIntercept, TopLeft_LeftIntercept,
        TopSide_BottomIntercept, BOTTOM)
    else if (RightSide=BottomRightCorner)
        Factor=TwoCornersThatIntersect(TopSide_BottomIntercept,
        TopLeft_LeftIntercept, 1-RightSide_BottomIntercept,
        RightSide_RightIntercept, BOTTOM_LEFT)
    else
        Error Condition
else if (TopSide=TopRightCorner)
    if (RightSide=TopBottomSlice)
        Factor=OneCornerOneSliceThatIntersect(1-TopSide_RightInter-
        cept, 1-TopSide_TopIntercept, 1-RightSide_TopIntercept,
        1-RightSide_BottomIntercept, TOP)
    else if (RightSide=LeftRightSlice)
        Factor=OneCornerOneSliceThatIntersect(1-TopSide_TopInter-
        cept, 1-TopSide_RightIntercept, 1-RightSide_RightIntercept,
        1-RightSide_LeftIntercept, BOTTOM_RIGHT)
    else if (RightSide=TopLeftCorner)
        Factor=TwoCornersThatIntersect(1-TopSide_TopIntercept,
        1-TopSide_RightIntercept, RightSide_TopIntercept,
        1-RightSide_LeftIntercept, BOTTOM_RIGHT)
    else if (RightSide=BottomRightCorner)
        Factor=TwoCornersThatIntersect(RightSide_RightIntercept,
```

-continued

```
            1-RightSide_BottomIntercept, 1-TopSide_RightIntercept,
            1-TopSide_TopIntercept, TOP)
        else
            Error Condition
    else if (TopSide=TopBottomSlice)
        if (RightSide=LeftRightSlice)
            Factor=TwoSlicesThatIntersect(TopSide_TopIntercept,
            TopSide_BottomIntercept, RightSide_LeftIntercept,
            RightSide_RightIntercept, TOP_LEFT)
        else if (RightSide=TopLeftCorner)
            Factor=OneCornerOneSliceThatIntersect(1-RightSide_LeftIntercept, RightSide_TopIntercept, TopSide_TopIntercept,
            TopSide_BottomIntercept, BOTTOM_LEFT)
        else if (RightSide=BottomRightCorner)
            Factor=OneCornerOneSliceThatIntersect(RightSide_RightIntercept, 1-RightSide_BottomIntercept, 1-TopSide_TopIntercept,
            1-TopSide_TopIntercept, TOP)
        else
            Error Condition
    else if (TopSide=LeftRightSlice)
        if (RightSide=TopBottomSlice)
            Factor=TwoSlicesThatIntersect(1-RightSide_TopIntercept,
            1-RightSide_BottomIntercept, TopSide_RightIntercept,
            TopLeft_LeftIntercept, BOTTOM_RIGHT)
        else if (RightSide=TopLeftCorner)
            Factor=OneCornerOneSliceThatIntersect(TopSide_TopIntercept, 1-TopLeft_LeftIntercept, 1-RightSide_LeftIntercept, 1-RightSide_RightIntercept, LEFT)
        else if (RightSide=BottomRightCorner)
            Factor=OneCornerOneSliceThatIntersect(1-RightSide_BottomIntercept, RightSide_Right Intercept, TopSide_RightIntercept, TopLeft_LeftIntercept, BOTTOM_RIGHT)
        else
            Error Condition
    else
        Error Condition
```

II. The subroutines listed above are as follows.

In the following subroutines, the identifiers XI and YI are the x and y coordinates of the intersections of two of the lines of the halftone cell 46 in the element 50. Four other variables are also defined as follows:

$ITL = XI * (1 - YI)$
$ITR = (1 - XI) * (1 - YI)$
$IBL = XI * YI$
$IBR = (1 - XI) * YI$

The element 50 is divided into various areas by the overlapping halftone cell 46 (i.e., BL is bottom left portion, TL is the top right, B is the bottom portion, T is the top portion, etc).

```
a.  OneCorner(W,H):

BL=W*H/2
    TR=1-BL
b.  OneSlice(W1,W2,H):

BL=W1*W2/2
    TR=1-BL
c.  TwoCornersWithoutIntersection(X1,Y1,X2,Y2):

BL=Y1*X1/2
    BR=Y2*X2/2
    T=1-BL-BR
d.  OneCornerOneSliceWithoutIntersection(XC,YC,XS1,XS2):

BL=YC*XC/2
    R=(XS1+XS2)/2
    TL=1-BL-R
e.  TwoSlices(X1,X2,Y1,Y2,AreaofInterest):

a=(XI-X1)*(1-YI)/2
    b=(YI-Y1)*XI/2
    c=(X2-XI)*YI/2
    d=(Y2-YI)*(1-XI)/2
    TL=ITL+b-a
    TR=ITR+a-d
    BR=IBR+d-c
    BL=IBL+c-b
f.  OneCornerOneSliceWithIntersection(XC,YC,YS1,YS2,AreaofInterest):

a=(YC-YI)*XI/2
    b=(YI-YSI)*XI/2
    c=(XC-XI)*YI/2
    d=(YS2-YI)*(1-XI)/2
    T=ITL+ITR-a-d
    BR=IBR+d-c
    BL=IBL+c-b
    L=a+b
g.  TwoCornersWithIntersection(X1,Y1,X2,Y2,AreaofInterest):

a=(Y1-YI)*XI/2
    b=(X2+XI-1)*YI/2
    c=(X1-XI)*YI/2
    d=(Y2-YI)*(1-XI)/2
    T=ITL+ITR-a-d
    BR=IBR+d-a
    B=b+c
    BL=IBL-b+a
```

What is claimed is:

1. A method for removing artifacts from a bitmap of image data produced by scanning a halftone image, the halftone image having a plurality of image dots arranged along a plurality of halftone lines, the halftone lines being oriented at a halftone angle and spaced at a halftone period, the bitmap of image data including a plurality of pixels, each pixel having an intensity value, comprising the steps of:

(a) calculating a size of a halftone cell based on the halftone period;

(b) calculating a size of a sample array sufficient to contain the halftone cell positioned at the halftone angle, the size of the sample array defining an integer number of elements that corresponds to a same integer number of pixels in the bitmap of image data;

(c) calculating a plurality of weight factors for the sample array based on a placement of the halftone cell at the halftone angle within the sample array, each of the plurality of weight factors corresponding to different ones of the elements in the sample array;

(d) calculating a weighted average intensity value for a target pixel based on the intensity values of the target pixel and neighboring pixels in the bitmap of image data and based on the weight factors in the sample array, the target pixel and neighboring pixels in the array of image data corresponding to the elements in the sample array;

(e) repeating step (d) for each pixel in the bitmap of image data; and (f) replacing the intensity value of each pixel in the bitmap of image data with the weighted average intensity value for each such pixel.

2. The method of claim 1, further comprising the steps of:
calculating the halftone angle from the intensity values of the pixels in the bitmap of image data; and
calculating the halftone period from the intensity values of the pixels in the bitmap of image data.

3. The method of claim 2, wherein the step of calculating the halftone angle comprises the steps of:
selecting a plurality of pixels from the bitmap of image data corresponding to m rows of n columns of pixels;

adding together the intensity values of the m pixels in each of the n columns of pixels to create a SumProfile for each of the n columns of pixels and for each of a predetermined number of ColumnOffset values;

adding together the SumProfiles for each of the ones of the ColumnOffset values to create a TotalChange corresponding to each of the predetermined number of ColumnOffset values; and finding the ColumnOffset value that corresponds to a greatest TotalChange, wherein the ColumnOffset value for the greatest TotalChange corresponds to the halftone angle.

4. The method of claim 3, wherein the step of calculating the halftone period comprises the steps of:

for the ColumnOffset value corresponding to the greatest TotalChange, finding a plurality of maxima SumProfiles and a plurality of minima SumProfiles, the maxima and minima SumProfiles corresponding to various ones of the n columns of pixels; and calculating an average number of columns of pixels separating adjacent maxima SumProfiles and minima SumProfiles, the average number of columns of pixels being substantially equal to one-half of the halftone period.

5. The method of claim 1, wherein the step of calculating a plurality of weight factors for the sample array comprises the steps of:

(a) determining a degree of overlap between the halftone cell and an element in the sample array;

(b) calculating a weight factor for the element that is proportional to the degree of overlap between the halftone cell and the element; and (c) repeating steps (a) and (b) for each element in the sample array.

6. The method of claim 1, wherein the step of calculating a weighted average intensity value for a target pixel comprises the steps of:

correlating the target pixel and the neighboring pixels with the elements in the sample array;

multiplying the intensity values of the target pixel and each of the neighboring pixels with the weight factors for each of the corresponding elements in the sample array to create a plurality of weighted pixel values corresponding to the number of elements in the sample array;

adding together the weighted pixel values to create a sum of weighted pixel values; and dividing the sum of weighted pixel values by an area of the halftone cell to create the weighted average intensity value.

7. A method of operating a computer to remove artifacts from a bitmap of image data produced by scanning a halftone image, the halftone image having a plurality of image dots arranged along a plurality of halftone lines, the halftone lines being oriented at a halftone angle and spaced at a halftone period, the bitmap of image data including a plurality of pixels, each pixel having an intensity value, comprising the steps of:

(a) calculating a size of a halftone cell based on the halftone period;

(b) calculating a size of a sample array sufficient to contain the halftone cell positioned at the halftone angle, the size of the sample array defining an integer number of elements that corresponds to a same integer number of pixels in the bitmap of image data;

(c) calculating a plurality of weight factors for the sample array based on a placement of the halftone cell at the halftone angle within the sample array, each of the plurality of weight factors corresponding to different ones of the elements in the sample array;

(d) calculating a weighted average intensity value for a target pixel based on the intensity values of the target pixel and neighboring pixels in the bitmap of image data and based on the weight factors in the sample array, the target pixel and neighboring pixels in the array of image data corresponding to the elements in the sample array;

(e) repeating step (d) for each pixel in the bitmap of image data; and (f) replacing the intensity value of each pixel in the bitmap of image data with the weighted average intensity value for each such pixel.

8. Computer readable media comprising program code for controlling a computer to remove artifacts from a bitmap of image data produced by scanning a halftone image, the halftone image having a plurality of image dots arranged along a plurality of halftone lines, the halftone lines being oriented at a halftone angle and spaced at a halftone period, the bitmap of image data including a plurality of pixels, each pixel having an intensity value, by performing the steps of:

(a) calculating a size of a halftone cell based on the halftone period;

(b) calculating a size of a sample array sufficient to contain the halftone cell positioned at the halftone angle, the size of the sample array defining an integer number of elements that corresponds to a same integer number of pixels in the bitmap of image data;

(c) calculating a plurality of weight factors for the sample array based on a placement of the halftone cell at the halftone angle within the sample array, each of the plurality of weight factors corresponding to different ones of the elements in the sample array;

(d) calculating a weighted average intensity value for a target pixel based on the intensity values of the target pixel and neighboring pixels in the bitmap of image data and based on the weight factors in the sample array, the target pixel and neighboring pixels in the array of image data corresponding to the elements in the sample array;

(e) repeating step (d) for each pixel in the bitmap of image data; and (f) replacing the intensity value of each pixel in the bitmap of image data with the weighted average intensity value for each such pixel.

9. A computer programmed to remove artifacts from a bitmap of image data produced by scanning a halftone image, the halftone image having a plurality of image dots arranged along a plurality of halftone lines, the halftone lines being oriented at a halftone angle and spaced at a halftone period, the bitmap of image data including a plurality of pixels, each pixel having an intensity value, by performing the steps of:

(a) calculating a size of a halftone cell based on the halftone period;

(b) calculating a size of a sample array sufficient to contain the halftone cell positioned at the halftone angle, the size of the sample array defining an integer number of elements that corresponds to a same integer number of pixels in the bitmap of image data;

(c) calculating a plurality of weight factors for the sample array based on a placement of the halftone cell at the halftone angle within the sample array, each of the plurality of weight factors corresponding to different ones of the elements in the sample array;

(d) calculating a weighted average intensity value for a target pixel based on the intensity values of the target pixel and neighboring pixels in the bitmap of image data and based on the weight factors in the sample array, the target pixel and neighboring pixels in the array of image data corresponding to the elements in the sample array;

(e) repeating step (d) for each pixel in the bitmap of image data; and (f) replacing the intensity value of each pixel in the bitmap of image data with the weighted average intensity value for each such pixel.

* * * * *